Feb. 17, 1970 M. M. A. GOUILLOUD 3,496,455

METHODS AND APPARATUS FOR INVESTIGATING EARTH FORMATIONS INCLUDING MULTIPLE FREQUENCY OPERATION AND PHASE CORRECTION AND QUADRATURE PHASE CANCELLATION USING A MAGNETIC CORE

Filed Feb. 2, 1965 3 Sheets-Sheet 1

Feb. 17, 1970 M. M. A. GOUILLOUD 3,496,455

METHODS AND APPARATUS FOR INVESTIGATING EARTH FORMATIONS INCLUDING MULTIPLE FREQUENCY OPERATION AND PHASE CORRECTION AND QUADRATURE PHASE CANCELLATION USING A MAGNETIC CORE

Filed Feb. 2, 1965 3 Sheets-Sheet 2

Feb. 17, 1970 M. M. A. GOUILLOUD 3,496,455

METHODS AND APPARATUS FOR INVESTIGATING EARTH FORMATIONS INCLUDING MULTIPLE FREQUENCY OPERATION AND PHASE CORRECTION AND QUADRATURE PHASE CANCELLATION USING A MAGNETIC CORE

Filed Feb. 2, 1965 3 Sheets-Sheet 3

United States Patent Office 3,496,455

Patented Feb. 17, 1970

3,496,455

METHODS AND APPARATUS FOR INVESTIGATING EARTH FORMATIONS INCLUDING MULTIPLE FREQUENCY OPERATION AND PHASE CORRECTION AND QUADRATURE PHASE CANCELLATION USING A MAGNETIC CORE

Michael Marie Albert Gouilloud, Clamart, France, assignor to Societe de Prospection Electrique Schlumberger, S.A., Paris, France, a corporation of France Filed Feb. 2, 1965, Ser. No. 429,816
Claims priority, application France, Feb. 6, 1964, 962,868
Int. Cl. G01v 3/12
U.S. Cl. 324—6 31 Claims

ABSTRACT OF THE DISCLOSURE

In accordance with an illustrative embodiment of the invention, an induction logging system is operated simultaneously at two separate frequencies which are variable but maintain a fixed relationship to one another. Transmitting current at both frequencies is utilized to energize a transmitting coil which emits electromagnetic fields therefrom. A receiving coil is responsive to the emitted field to produce a received signal having in-phase and phase-quadrature components at both frequencies. The phase quadrature component of the received signal at a first frequency is detected and substantially cancelled by varying the permeability of a saturable magnetic core situated between the transmitting and receiving coils in response to the detected quadrature component. The operating frequencies are varied in response to the in-phase component of the received signal at a second frequency and a measure of a desired characteristic of the investigated formations is provided in response to this inphase component. The investigating system is also adapted to correct for undesired phase shifts in the investigating equipment at both frequencies by modulating the field directly coupling the transmitting coil with the receiving coil. This modulation is accomplished by varying the permeability of the magnetic core at a given modulation frequency. The resulting modulated signal induced in the receiving coil is then used to individually adjust the phases of the transmitting current at both frequencies to compensate for the undesired phase shifts.

This invention relates to methods and apparatus for investigating subsurface earth formations traversed by a borehole and, more particularly, to methods and apparatus for measuring electrical resistance properties of subsurface earth formations by means of alternating currents which are caused to flow in such formations.

It is known to investigate the electrical resistance properties of various subsurface strata penetrated by a borehole by moving an exploring device through the borehole and producing a flow of alternating current in the formation material immediately adjacent the borehole and measuring the manner in which the magnitude of this alternating current or the magnitude of the electromagnetic field associated therewith varies as the exploring device is moved along the course of the borehole. A problem sometimes arises, however, as to the proper frequency to use for the alternating current. If too high a frequency is utilized, various undesired effects in non-linearity may enter into the measurements. The use of a high frequency on the other hand, frequently tends to improve the accuracy of the measurement and reduce the size and complexity of the apparatus. If too low a frequency is used, however, it is sometimes difficult to obtain a reading sufficient in magnitude.

This situation has been known to occur for the case of induction logging methods and apparatus. Induction logging investigations of a borehole drilled into the earth are made by moving a suitable coil system through the borehole. Such a coil system commonly includes one or more transmitter coils and one or more receiver coils, the coils being mounted on a suitable support member at a fixed spatial relationship relative to one another. The transmitter coils are energized with alternating current to induce a secondary current flow in the adjacent material. The electro-magnetic field resulting from the secondary current flow induces a voltage signal in the receiver coil or coils. This voltage signal varies in accordance with the electrical conductivity value of the formation material and is recorded by suitable recording apparatus for providing a continuous record or log of the conductivity values as a function of borehole depth.

Known types of induction logging systems are described in a technical paper by H. G. Doll, entitled "Introduction to Induction Logging and Application to Logging of Wells Drilled with Oil Base Mud," which appeared in the June, 1949 issue of The Journal of Petroleum Technology. This paper shows that a linear relationship exists between the electrical conductivity value of the formation material being investigated and the magnitude of a particular voltage component induced in the receiver coil for the case where the magnitude of the transmitter coil energizing current is held constant. However, as is known, this linear relationship applies with a high degree of accuracy only to lower frequencies for the transmitter coil energizing current.

As higher frequencies are used, the relationship between the formation conductivity value and the desired voltage component induced in the receiver coil becomes more non-linear in nature. This non-linearity is caused by the so-called electrical "skin effect" phenomena. It is the same type of phenomena which is encountered in the high frequency operation of other types of electrical circuits and devices.

Non-linearity introduced by this "skin effect" phenomena is relatively complex in nature. In addition to being dependent upon the coil system operating frequency, it also depends in a relatively complex manner on the value of the formation conductivity, the physical construction of the induction logging apparatus, and other borehole conditions. Under some conditions and for some forms of construction, the occurrence of "skin effect" is practically nil. Under other circumstances, the "skin effect" phenomena becomes quite significant and substantial errors may be introduced into the measurements unless it is taken into account.

Methods of minimizing this "skin effect" error are described in U.S. Patent No. 3,119,061, granted to D. R. Tanguy on Jan. 21, 1964. In one of these methods, the product of frequency and conductivity is held constant by varying the frequency of the transmitted signal, thus maintaining the voltage due to the skin effect error at a low value. Tanguy also describes methods and apparatus for cancelling the phase quadrature component of the received signal. That is, among other things, the component 90° out of phase with the transmitter current. It is usually desired to cancel this phase-quadrature component of the received signal because the conductivity of the earth surrounding the borehole is more directly related to the received voltage component which is in phase agreement with the transmitter coil current.

In U.S. Patent No. 3,147,429, granted to J. H. Moran on Sept. 1, 1964, it was mathematically shown that the magnitude of the quadrature phase component resulting from secondary current flow in the earth formation is approximately equal to the magnitude of any skin effect component encountered in the in-phase signal. Thus, if the phase-quadrature component resulting from secondary current flow in the earth formation is measured, the error in the in-phase signal due to skin effect can be corrected. In order to accurately measure the phase-quadrature component resulting from earth current flow, it is necessary to eliminate any phase-quadrature component resulting from direct flux coupling between transmitter and receiver coils. While this might be done in various ways, it would be desirable in some cases to employ an automatic quadrature cancellation method similar to that described in the Tanguy patent. As is apparent, this would be difficult to do without also cancelling the quadrature component it is desired to measure.

Even if the skin effect error in the received signal were to be substantially minimized and, at the same time, the phase-quadrature component of the received signal due to secondary current flow were to be measured, the conductivity measurements may, nevertheless, not always be as accurate as is desired. Another source of error that sometimes occurs is where undesired phase shifts take place in the receiving coils and the amplifying and detecting stages associated with the receiving coils, as well as the transmitting apparatus. The magnitude of these undesired phase shifts are dependent, among other things, on the temperature in the borehole and the varying frequency of the transmitted signal. If the borehole temperature and the transmitting frequency are varied over a relatively wide range, undesired phase shifts of unknown magnitude will be introduced in the received signal.

If the logging equipment cannot determine the extent of undesired phase shifts or determine if there are any phase shifts at all, the measurements taken by the logging equipment may be in error by an unknown amount. Therefore, the problem arises of ensuring that the detecting circuits associated with the receiving coils will, in fact, detect the received signal with respect to a correct phase reference, thus compensating for any undesired phase shifts that may occur.

It would be desirable, therefore, to continuously correct the phase of the received signal, while at the same time, varying the frequency of the transmitted signal to minimize the magnitude of the received signal due to skin effect. By accomplishing both functions at the same time, more accurate measurements of the earth conductivity surrounding the borehole may be obtained. In correcting phase errors introduced into the received signal, the problem arises, however, of not allowing the varying frequency to have an undesired effect on the phase correction.

It has been found that some of these desired accomplishments may best be obtained by simultaneously operating an induction logging coil system at two different frequencies. This, however, presents some difficulties in maintaining the proper phase relationships between the various signals, particularly if both frequencies are simultaneously varied.

It is an object of the invention, therefore, to provide new and improved methods and apparatus for more accurately measuring electrical properties of the subsurface earth formations penetrated by a borehole.

It is another object of the invention to provide new and improved induction logging apparatus where skin effect errors are substantially minimized.

It is a further object of the invention to provide new and improved induction logging methods and apparatus for substantially minimizing the component of the received signal which is in phase-quadrature with the current in the transmitter coils.

It is a further object of the invention to provide new and improved electrical borehole investigating methods and apparatus for continuously correcting for undesired phase shifts in the electrical circuits of the apparatus.

It is still a further object of the invention to provide new and improved electrical borehole investigating methods and apparatus for substantially minimizing a major portion of the component of the received signal which is in phase-quadrature with the current in the transmitter coils while, at the same time, detecting the magnitude of the phase-quadrature component resulting from secondaary current flow in the earth formation.

It is a still further object of the invention to provide new and improved circuitry for continuously adjusting the phase of an applied signal in response to other applied signals.

It is an additional object of the invention to provide new and improved electrical borehole investigating methods and apparatus for continuously correcting undesired phase shifts in the received signal while, at the same time, the frequency of the transmitted signal varies over a wide range.

It is yet another object of the invention to provide new and improved electrical borehole investigating methods and apparatus for maintaing the in-phase and phase-quadrature signals in correct phase relationship to one another.

It is still another object of the invention to provide new and improved electrical borehole investigating methods and apparatus for maintaining accurate phase relationships between in-phase and phase-quadrature reference signals where signals at different frequencies are used.

It is a still further object of the invention to provide new and improved electrical borehole investigating methods and apparatus for accomplishing a plurality of the aforesaid objects simultaneously.

In accordance with the invention, methods and apparatus for investigating earth formations comprises inducing an electromagnetic field into the ground and producing a received signal in response to the field initiated by the inducing means, said received signal containing in-phase and phase-quadrature components. The apparatus further includes minimizing the phase-quadrature component of said received signal by varying the permeability of a magnetic core located in magnetic proximity to the inducing and receiving means. In another form, the phase of the field induced into the ground is adjusted to compensate for undesired phase shifts. Additionally, in-phase and phase-quadrature components of the received signal can be detected to provide a measure of a characteristic of the formations.

For a better understanding of the present invention, together with other and further objects thereof, reference is had to the following description taken in connection with the accompanying drawings, the scope of the invention being pointed out in the appended claims.

Referring to the drawings.

Figure 1:
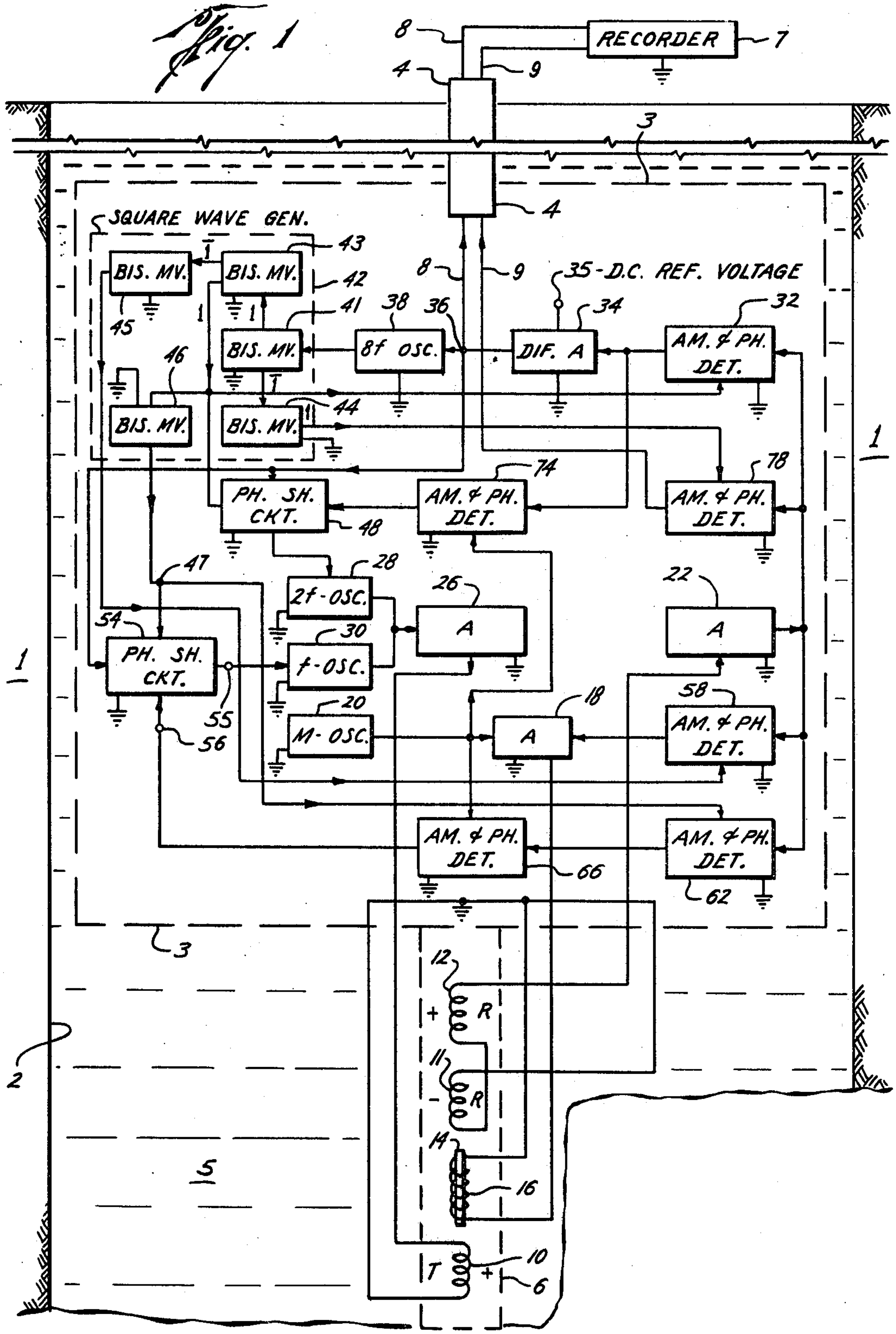
FIG. 1 is a schematic illustration of a representative embodiment of a borehole induction logging system constructed in accordance with principles of the present invention.

Referring to FIG. 1, there is shown a borehole 2 drilled into subsurface earth formations 1. The borehole 2 is usually filled with a drilling liquid or drilling mud 5. There is also shown in FIG. 1 electrical logging apparatus which includes a coil system 6 adapted for movement through the borehole 2 for investigating the earth formations 1 adjacent thereto. The coil system 6 includes a transmitter coil 10 and spaced receiver coils 11 and 12 and an intermediate coil 16 wound around a magnetic core 14. Coils 10, 11 and 12 are aligned coaxially with one another and with the longitudinal axis of the logging apparatus, the latter extending in a longitudinal direction in the borehole. In the present embodiment, coil 16 is similarly aligned though it may in some cases have a different alignment.

The electrical circuits for operating coil systems 6 are contained within a fluid-tight housing 3 which is mechanically attached to the mechanical supporting structure of the coil system 6 and adapted for movement through the borehole 2. Electrical power for operating the downhole electrical circuits is supplied to such circuits by a power supply (not shown) located at the surface of the earth. For the sake of simplicity, the connections of the power supply unit to the various circuits are not shown. Suitable means (not shown) are provided for raising and lowering the downhole apparatus in the borehole tool and also for advancing the recording media of a surface-located recorder 7 in synchronism with such movement.

Turning to coil system 6, transmitter coil 10 is energized with alternating current $I_t$ supplied from transmitting amplifier 26. The flow of this alternating current $I_t$ in transmitter coil 10 creates an alternating electro-magnetic flux field surrounding the transmitter coil. This alternating flux field induces a secondary current flow commonly referred to as "eddy current," in the formation material 1 adjacent the transmitter coil 10. This induced secondary current, in general, flows around the coil system 6 in circular loops which are coaxial with the center axis of the transmitter coil 10 and, therefore, generally coaxial with the center axis of the borehole 2. Where the drilling fluid 5 is of a conductive nature, some secondary current flows therein.

This flow of secondary current in the earth formation 1 induces a voltage component in receiver coils 11 and 12. This voltage component has in-phase and phase- quadrature components. The magnitude of the in-phase voltage component is proportional to the magnitude of the in-phase component of secondary current flow which, in turn, is proportional to the conductivity value of the formation material. The greater the formation conductivity, the greater the secondary current flow and consequently the greater is this receiver coil voltage component due to secondary current flow. The in-phase voltage component induced in the receiver coils due to this secondary current flow may depart from a linear relationship with respect to the formation conductivity value because of the occurrence of "skin effect" phenomena in the flow of such secondary current.

There is also induced in the receiver coils 11 and 12 a second voltage component caused by direct flux coupling between the transmitter and receiver coils. This second voltage component is distinguishable from the first voltage component by the fact that it is in "phase quadrature" with, that is 90° out of phase with the current $I_t$ flowing in the transmitter coil 10. The voltage component resulting from secondary current flow in the earth formation on the other hand is more or less "in-phase" with the transmitter coil current $I_t$.

The formula for the voltage of the signal received at the receiving coils of an induction logging system has been derived in U.S. Patent No. 3,119,061, supra. Generally speaking, the received signal $V_r$ for a homogeneous conductive body may be described by the formula:

$$V_r = I_t[(Af^2\sigma - Bf^{5/2}\sigma^{3/2}) + j(2\pi f M_o - Bf^{5/2}\sigma^{3/2})] \quad (1)$$

$I_t$ being the current in the transmitter coil, $f$ the frequency of the transmitter coil current, $\sigma$ the conductivity of the earth surrounding the borehole, $M_o$ the mutual inductance between the transmitting and receiving windings, and A and B being proportionality constants. This formula is valid when:

$$B\sqrt{f} << A \quad (2)$$

which shall be assumed to be the present case.

Looking now at the formula for the received signal $V_r$, the first part of the real component, that is, $I_tAf^2\sigma$, is the in-phase component of the received signal which is proportional to the conductivity of the surrounding earth. The second part of the real component of the received voltage, that is, $I_tBf^{5/2}\sigma^{3/2}$ is the modification of the in-phase component of the received voltage due to skin effect. The detecting apparatus in the receiving equipment cannot discriminate between these two aspects of the in-phase signal and therefore indicates the net sum of these two components, that is, the total in-phase voltage, called the apparent conductivity. It can be seen from Equation 1 that as soon as the conductivity or frequency becomes important, the received voltage component due to skin effect will begin to substract substantially from the linear voltage component which is proportional to the conductivity of the surrounding earth, that is, the $I_tAf^2\sigma$ term.

The apparatus of FIG. 1 includes a feedback control system or control loop for maintaining the error due to skin effect at a low value. This feedback loop includes transmitting amplifier 26, transmitting coil 10, receiving coils 11 and 12, receiving amplifier 22, amplitude and phase detector 32, differential amplifier 34, voltage-controlled oscillator 38, and back through square wave generator 42, voltage controlled phase shifter 48, and oscillator 28 to transmitting amplifier 26.

Transmitting coil 10 receives a signal at frequency $2f$ from $2f$ oscillator 28 and transmitting amplifier 26 which is transmitted into the ground by the magnetic flux set up by transmitting coil 10. One component of this signal is the magnetic flux from the transmitting coil 10 which sets up secondary currents in the ground which in turn induce a magnetic flux linking receiver coils 11 and 12 which induces a signal in receiver coils 11 and 12. This signal is amplified by receiving amplifier 22 and then fed to amplitude and phase detector 32 which has an input filter that accepts only the $2f$ frequency. Amplitude and phase detector 32 detects the component of the received signal at frequency $2f$ which is in phase with the transmitter current $I_t$ at frequency $2f$. Thus, the output of amplitude and phase detector 32 has a DC component which is proportional to the in-phase component of the received signal at frequency $2f$. This DC output signal is fed to differential amplifier 34, which has a constant DC reference voltage applied at terminal 35. The input of differential amplifier 34 has a low-pass filter to cancel a certain hundred cycle component which, as will be seen, is also present in the received signal. The output signal from differential amplifier 34 is proportional to the difference between the constant reference voltage applied at point 35 and the applied DC voltage from amplitude and phase detector 32. The DC output signal from differential amplifier 34 is then applied to the voltage-controled oscillator 38 to control the frequency of the output signal from oscillator 38. Oscillator 38 is constructed to operate at a frequency of $8f$ or, in other words, at a frequency four times higher than that of oscillator 28. The signal from variable-frequency oscillator 38, at a frequency $8f$, is then sent to square wave generator 42. After frequency division in square wave generator 42, the resulting output signal at a frequency $2f$ is then supplied to voltage-controlled phase shift circuit 48, $2f$ oscillator 28, and then to transmitting amplifier 26 and transmitting coil 10. Oscillator 28 is of the phase-locked type so that its frequency and phase are accurately in step with the signal from phase shift circuit 48.

Looking now at the real component of Equation 1, and remembering that $B\sqrt{f} \ll A$ from Equation 2, it can be seen that the transmitted frequency can be adjusted so that the second part of the real component of Equation 1, that is, $B \cdot f^{5/2} \cdot \sigma^{3/2}$, which is the skin effect component, will always be small with respect to $Af^2\sigma$ whatever may be the value of $\sigma$. This result is achieved by keeping the real component of Equation 1 at a small constant value, which is achieved by the aforementioned feedback loop. The DC component of the output signal from amplitude and phase detector 32, which DC output signal is proportional to the real component of Equation 1, is maintained at a constant voltage by the operation of the feedback loop. More particularly, the feedback action is degenerative, that is, as the DC output of amplitude and phase detector 32 tends to increase above the reference voltage value, the DC output from differential amplifier 34 will change in the proper direction to decrease the frequency of oscillator 38, which in turn will decrease the DC voltage from the output of amplitude and phase detector 32. In a similar manner, when the DC output of amplitude and phase detector 32 tends to decrease below the reference value, the DC output of differential amplifier 34 will change in the proper direction to increase the oscillation frequency of oscillator 38, which will tend to increase the DC output voltage from amplitude and phase detector 32. Thus, it can be seen that the DC output voltage from amplitude and phase detector 32 is maintained at a constant voltage, which in turn maintains the skin effect portion of the real component of Equation 1 at a small value.

Referring to the Equation 1, the real component can be written:

$$V_x = I_t A f^2 \sigma_a \quad (3)$$

where $\sigma_a$ is the apparent conductivity. It is seen from $$\sigma_a = \frac{V_x}{I_t A f^2} \quad (4)$$

It can thus be seen that the apparent conductivity $\sigma_a$ is inversely proportional to the square of the frequency. Since the control to variable oscillator 38 follows a linear law, the voltage appearing at the output of differential amplifier 34 is proportional to the frequency. Thus, it can be seen that the apparent conductivity can be determined from the DC voltage at the output of differential amplifier 34. To this end, as is shown in FIG. 1, this DC voltage signal appearing at terminal 36 is supplied by way of a cable conductor 8 to the recorder 7 located at the surface of the earth. If the control of oscillator 38 should not be sufficiently linear, it would then be preferable to measure the period of the output signal from oscillator 38, which is accurately proportional to the square root of the apparent conductivity $\sigma_a$. Thus, by providing a feedback loop controlling an oscillator 38, whose frequency may vary over a wide range, it is possible to obtain measurements of conductivity extending between very low and very large values, with a minimum amount of skin effect distortion entering into these measurements.

Figure 2:
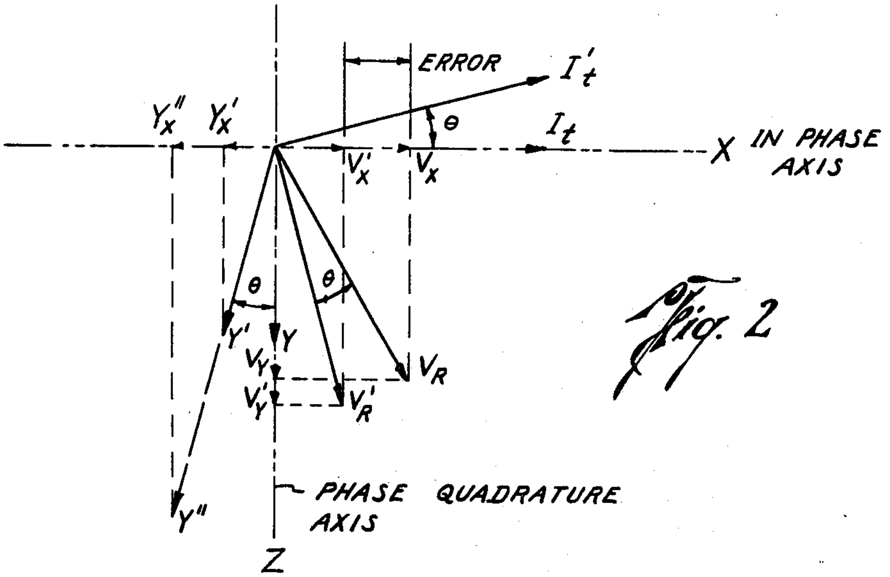
FIG. 2 is a vector diagram showing some phase relationships involved in the FIG. 1 system.

Now considering the phase correction operation which constitutes another feature of the present invention, it is helpful to obtain an understanding of the phase relationships involved. Looking at FIG. 2, there is shown a vector diagram wherein the vectors represent voltages and currents at different points in the circuit of FIG. 1. There is shown an in-phase axis X, which is horizontally disposed in FIG. 2, and a phase-quadrature axis Z, which is vertically disposed in FIG. 2. Considering the current $I_t$ in transmitting coil 10 as represented by a vector lying on the right-hand side of the in-phase axis X, there is shown a voltage vector $V_r$ lagging in phase behind the transmitter current $I_t$. This represents the total received signal. The in-phase component of the received signal $V_r$ represented by the vector $V_x$ in FIG. 2, is then detected to obtain the value of the conductivity of the surrounding earth. However, under adverse operating conditions, there will tend to be undesired phase shifts in the windings, and amplifying and detecting stages which will shift the received voltage $V_r$ across the receiving coils 11 and 12 by some angle $\theta$. Thus, as far as the detector on the receiving side is concerned, the voltage $V_r$ received in the receiving coils is shifted by the angle $\theta$ to a new vector location shown as $V_r'$ in FIG. 2. The in-phase component of received signal $V_r'$ is changed to a new value, shown as $V_x'$ in FIG. 2. This phase shift of the received signal produces an error which has a magnitude equal to the difference between $V_x$ and $V_x'$, as shown in FIG. 2, thus, producing an error in the conductivity reading of a proportional amount. Without phase correction circuitry, the magnitude of this error will be unknown.

To correct for these undesired phase shifts, a voltage of known phase relationship with respect to the transmitting current, $I_t$, is induced into the receiver coils. This phase reference signal is modulated to distinguish it from other signals induced in the receiver coil. The phase reference signal is then used to correct for any undesired phase shifts which may be introduced into the received signal.

Figure 3:
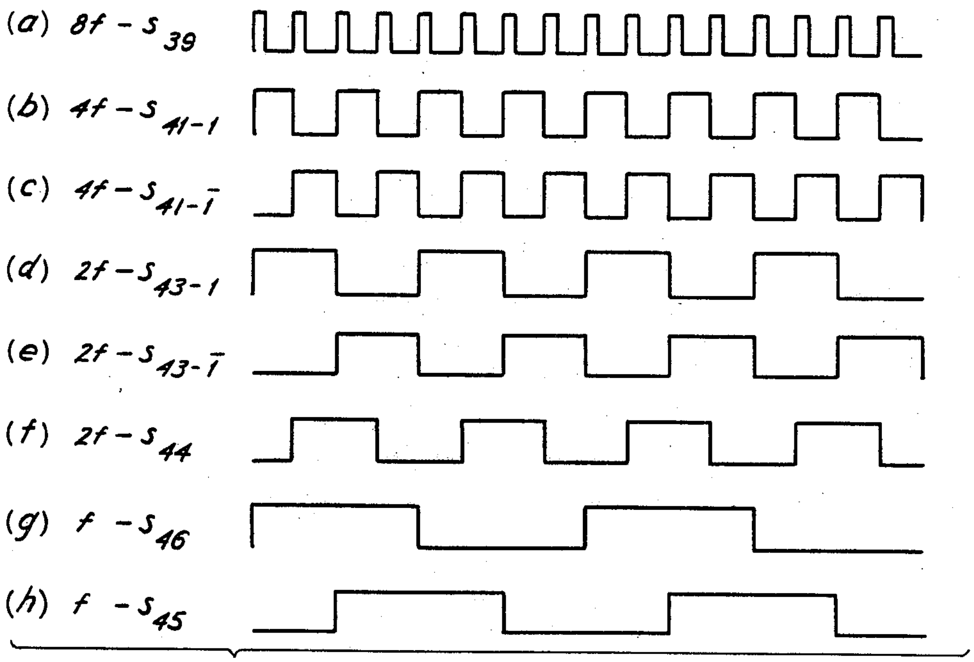
FIG. 3 is an illustration of the wave shapes at different points in a portion of the FIG. 1 system.

Before considering the phase correction operation of the present invention, it would be desirable to first consider the operation of square wave generator 42, shown in FIG. 1, since all detecting signals except the modulation frequency detection signal originate from square wave generator 42. The 8*f* frequency output signal from variable oscillator 38, which signal is shown in FIG. 3*a*, is applied to a bistable multivibrator 41. The "1" output signal at frequency 4*f* from bistable multivibrator 41, shown in FIG. 3*b* is applied to bistable multivibrator 43. The "1" output signal from bistable multivibrator 43, shown in FIG. 3*d* as the in-phase signal at frequency 2*f* is applied to a bistable multivibrator 46. It is also supplied to amplitude and phase detector 32 and voltage-controlled phase shift circuit 48. The "$\bar{1}$" output signal at frequency 4*f* from bistable multivibrator 41, shown in FIG. 3*c*, is applied to a bistable multivibrator 44. The "1" output signal from bistable multivibrator 44, shown in FIG. 3*f* as the phase-quadrature signal at frequency 2*f* is applied to an amplitude and phase detector 78. The "1" output signal from bistable multivibrator 46, shown in FIG. 3*g* as the in-phase signal at frequency *f* is applied to voltage-controlled phase shift circuit 54 and to amplitude and phase detector 62. The "$\bar{1}$" output signal from bistable multivibrator 43, shown in FIG. 3*e* at frequency 2*f* is applied to bistable multivibrator 45. The "1" output signal from bistable multivibrator 45, shown in FIG. 3*h* as the phase-quadrature signal at frequency *f*, is applied to amplitude and phase detector 58.

It is seen, then, that the output signals from square wave generator 42 are either at 0° or 90° at frequency *f* or 2*f*.The frequency and phase relationships are exact because of the inherent operation of bistable multivibrators. Of course, if more frequencies were required, more bistable multivibrators could be added to provide 0° and 90° output signals at frequencies 3*f*, 4*f*, etc.

Looking now at FIG. 1, the circuitry for correcting undesired phase shifts at frequency *f* includes a feedback circuit portion and a modulating circuit portion. The feedback portion includes receiving coils 11 and 12, amplifier 22, amplitude and phase detectors 62 aand 66, voltage-controlled phase shift circuit 54, oscillator 30 (operating at frequency *f*) and transmitting amplifier 26. The modulating circuit portion includes modulating oscillator 20 operating at a frequency of, for example, 100 cycles, mixer amplifier 18, saturable magnetic core 16, and coil 14. The current $I_t$ which flows through transmitting coil 10 sets up a direct flux linking transmitting coil 10 and receiving coils 11 and 12. The voltage of the signal received in receiving coils 11 and 12 due to this direct flux linkage is exactly 90° out of phase with the transmitting current $I_t$. This direct flux linking the transmitting and receiving coils is modulated by the hundred cycle signal from modulating oscillator 20 and amplifier 18 applied to coil 16. This modulated signal is picked up by receiving coils 11 and 12 along with the component of voltage from the secondary currents induced in the earth and after amplification by amplifier 22, is applied to amplitude and phase detector 62, which has an input filter which accepts only frequency $f$ signals. Also applied to amplitude and phase detector 62 is an in-phase detecting signal or reference signal at frequency $f$, shown in FIG. 3*g*, from bistable multivibrator 46.

Amplitude and phase detector 62 detects the in-phase component of the received signal at frequency $f$. The amplitude of the hundred cycle component of the output from amplitude and phase detector 62 will be dependent upon the phase relationship of the carrier component at frequency $f$ of the modulated signal with respect to the applied in-phase detecting signal at frequency $f$ from bistable multivibrator 46. Thus, if the $f$ frequency carrier portion of the modulated wave is 90° out of phase with the detecting signal from bistable multivibrator 46, the amplitude of the hundred cycle modulating signal output from amplitude and phase detector 62 will be zero. On the other hand, if the $f$ frequency of the carrier portion of the modulated signal is exactly in-phase with the detecting signal from bistable multivibrator 46, the amplitude of the hundred cycle output signal from amplitude and phase detector 62 will be at a maximum.

The hundred cycle output signal from amplitude and phase detector 62 is applied to amplitude and phase detector 66 which rejects the DC output from amplitude and phase detector 62 by suitable means, as, for example, a blocking capacitor. Also applied to amplitude and phase detector 66 is a hundred cycle detecting signal or reference signal from oscillator 20. Amplitude and phase detector 66 detects the hundred cycle component of the signal received from amplitude and phase detector 62. The output from amplitude and phase detector 66 is a DC signal indicative of the phase relationship of the modulated reference signal with respect to the square wave detecting signal from square wave generator 42. This DC signal from amplitude and phase detector 66 is then applied to voltage-controlled phase shift circuit 54 to control the phase shifting operation of phase shift circuit 54. Also applied to phase shift circuit 54 is an in-phase square wave signal at frequency $f$ shown in FIG. 3*g*. The DC signal from amplitude and phase detector 66 controls the phase shift of the square wave signal from bistable multivibrator 46 in accordance with the detected phase error. The $f$ frequency output signal from phase shift circuit 54 is then applied to the $f$ frequency oscillator 30, which is phase and frequency locked to the output signal from phase shift circuit 54. The output from oscillator 30 is an $f$ frequency sinusoidal signal having a phase relationship to bistable multivibrator 46 determined by the phase shifting operation of phase shift circuit 54. This $f$ frequency sinusoidal output from oscillator 30 is then amplified by transmitting amplifier 26 and then applied to transmitting coil 10.

It can thus be seen that as the 100 cycle modulated phase-quadrature signal varies from the phase-quadrature axis which axis is 90° out of phase with the detecting signal applied to amplitude and phase detector 62, the DC output from amplitude and phase detector 66 will tend to increase which in turn will change the phase shift of the output signal from phase shift circuit 54 to oscillator 30, which in turn will cause the sinusoidal signal applied to transmitting coil 10 to be shifted in phase in the proper direction to return the phase-quadrature signal to the phase-quadrature axis. In other words, the feedback action is degenerative. Thus, the phase shift of the signal applied at transmitting coil 10 will cause the modulated phase-quadrature signal to return to a position on the phase-quadrature axis, because of the inherent tendency of this degenerative feedback loop to reduce substantially to zero the DC signal appearing on the output of amplitude and phase detector 66.

Referring again to FIG. 2, the phase correction operation just described will be explained in terms of the vector diagram of FIG. 2. First, it should be noted that the square wave signals from square wave generator 42, which is fed by oscillator 38 define the main reference axes of the system. All of the output signals from square wave generator 42 are referenced to the main axis system shown as the in-phase axis and phase-quadrature axis in FIG. 2. In other words, every output signal from square wave generator 42 will either be vectors on the in-phase axis or vectors on the phase-quadrature axis. It is further noted that, strictly speaking, separate vector diagrams should be used where there are sets of signals at two different frequencies, since a vector diagram is limited to the representation of signals at the same frequency. However, since the signals at any given one of the different multiple frequencies have the same relative phase relationships, the same vector diagram will be used to explain the operations at each of the different multiple frequencies.

Looking at both FIGS. 1 and 2 together and considering the case of signals at the first frequency $f$, then, assuming no erroneous phase shifts in the system, it can be seen that the current, $I_t$, at frequency $f$ in transmitting coil 10 has a vector $I_t$ on the in-phase axis of FIG. 2. The voltage $V_r$ at frequency $f$ induced in receiving coils 11 and 12 lags the transmitting current $I_t$, shown in FIG. 2 as $V_r$. The detected in-phase component $V_x$ at frequency $f$, which is proportional to the conductivity of the surrounding earth, is shown on the in-phase axis in FIG. 2.

Now, because of undesirable phase shifts in different ones of the circuits, the voltage $V_r$ at frequency $f$ induced in receiving coils 11 and 12 is shifted by a phase angle $\theta$ to a new vector location $V_r'$. The in-phase component $V_x'$ of the received voltage $V_r'$ has a different magnitude, the error being the difference between $V_x$ and $V_x'$.

However, by applying a hundred cycle modulating signal to coil 16, the direct flux component of the transmitter coil signal at frequency $f$ is modulated at a rate of one hundred cycles and this modulated signal is received by receiving coils 11 and 12. This direct flux component is in phase-quadrature with the current $I_t$ in transmitting coil 10. If there were no phase shifts in the equipment, the phase-quadrature modulated signal would be on the phase-quadrature axis, shown as Z in FIG. 2. However, when there are undesired phase shifts in the equipment, the modulated phase-quadrature signal component, Y, will be displaced by angle $\theta$ shown as vector Y' in FIG. 2. The detecting signal at frequency $f$ from bistable multivibrator 46 to amplitude and phase detector 62 detects the in-phase component $Y_x'$ of the modulated phase-quadrature signal Y'. This signal $Y_x'$, after detection in detector 66, provides the DC signal applied to the voltage-controlled phase shift circuit 54 to control the phase shifting operation of phase shift circuit 54. Thus, it can be seen from FIG. 2 that if the modulated phase-quadrature signal Y' were always on the phase-quadrature axis Z, there would be no DC output signal from amplitude and phase detector 66 and thus, there would be no phase shift by phase shift circuit 54 of the applied square wave signal from bistable multivibrator 46. On the other hand, the greater the angle $\theta$, that is, the more pronounced the erroneous phase shift, the greater the DC output from amplitude and phase detector 66, and thus, the greater the phase shifting operation of phase shift circuit 54.

This phase shifting operation by phase shift circuit 54 shifts the transmitter current $I_t$ at frequency $f$ by the angle $\theta$ to produce $I_t'$ as shown in FIG. 2. The new transmitter current vector $I_t'$ is shifted in phase whenever necessary so as to maintain the modulated phase-quadrature signal Y always on the phase-quadrature axis Z. Thus, as the transmitter current vector $I_t'$ is shifted in phase to maintain the phase-quadrature modulated signal Y on the phase-quadrature axis Z, the voltage induced in receiving coils 11 and 12 will readjust to the vector location shown as $V_r$ in FIG. 2. Thus, the in-phase component $V_x$ of received voltage $V_r$ will be correct, thus eliminating the error due to any undesired phase shifts caused by the various circuits.

Figure 4:
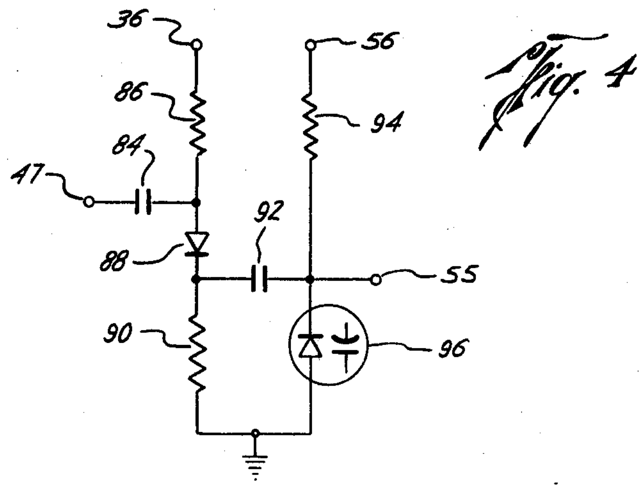
FIG. 4 shows in a detailed manner the circuit elements which may be used in a voltage controlled variable phase-shift circuit portion of the FIG. 1 system.

Turning now to FIG. 4, there is shown a detailed circuit diagram of a phase shift circuit which may be used for each of the phase shift circuits 48 and 54 of FIG. 1. The *f* frequency phase shift circuit 54 will be utilized in explaining the operation of the circuit. Both phase shift circuits, 48 and 54, operate in the same manner, however. The DC output signal or phase error signal from amplitude and phase detector 66 is applied to point 56 in FIG. 4. In series with terminal 56 is a resistor 94 of large value and a backward biased semi-conductor diode 96, of variable capacitance (e.g., a varicap). The capacitance of diode 96 will vary as a function of the voltage applied to it. The DC output signal from differential amplifier 34 is applied to terminal 36. In series with terminal 36 is a resistor 86 of large value, a forward biased semiconductor diode 88, and a resistor 90 of large value. A capacitor 92 of high capacitance is coupled between the junction of diode 88 and resistor 90 and the junction of resistor 94 and diode 96. Also coupled to the junction between diode 96 and resistor 94, terminal 55 provides the output signal to oscillator 30. The square wave signal from bistable multivibrator 46, shown in FIG. 3*g* as the in-phase signal at frequency *f*, is applied to terminal 47, then to capacitor 84 of high capacitance and then to forward biased diode 88.

The square wave input at terminal 47 from bistable multivibrator 46 is passed with negligible attenuation by capacitor 84 due to its high capacitance. Diode 88 then passes only that portion of the applied square wave signal which is positive with respect to the steady state voltage appearing at the cathode of diode 88, which steady state voltage is determined by the voltage at terminal 36 divided by the voltage dividing effect of resistors 86 and 90 in series with terminal 36. This positive square wave pulse is then applied to capacitor 92 which acts as a short circuit to the square wave signal due to its high capacitance. Meanwhile, the DC phase error voltage output from amplitude and phase detector 66 (shown in FIG. 1) which is applied to terminal 56 is fed through resistor 94 to variable-capacitance diode 96. The capacitance of diode 96 will vary as a function of the DC voltage applied to it. The voltage applied to a capacitor cannot change instantaneously, the voltage as at point 55 will build up at a rate dependent upon the capacitance of diode 96 in combination with the resistance through which the capacitance of diode 96 must charge. The voltage applied to diode 96 will charge up through the forward resistance of diode 88. The resistance of diode 88 to the square wave signal applied at terminal 47 is a function of the steady state or DC current through diode 88. Thus, the DC voltage from differential amplifier 34 applied to terminal 36 will determine the resistance of diode 88 to the square wave signal applied at terminal 47. Since the output of differential amplifier 34 is controlling the frequency of oscillator 38, the DC voltage at terminal 36 is proportional to the frequency of oscillator 38 and subsequently by way of square wave generator 42, is proportional to the frequency of the *f* oscillator 30.

To better understand why the phase shifting operation of phase shift circuit 54 should be dependent upon frequency, reference is had to FIG. 2 of the drawings. Since the voltage induced in receiving coils 11 and 12 at frequency *f* by the magnetic flux set up by the current $I_t$ in transmitting coil 10 is a function of frequency (*f* is a variable frequency), the modulated phase-quadrature signal Y′ will vary in magnitude as a function of frequency. This variation in magnitude of the modulated phase-quadrature signal will introduce an error into the phase-correcting operation. For example, if the frequency should increase sufficiently to cause the modulated phase-quadrature reference signal Y′ to increase as shown by the vector Y″ in FIG. 2, the DC control signal from amplitude and phase detector 66 will increase from a point $Y_x'$ to a point $Y_x''$ as shown in FIG. 2. Thus, the DC control voltage applied at terminal 56 in FIG. 4 will cause the capacitance of diode 96 to increase by a similar amount which in turn will give an increased phase shift to oscillator 30 (shown in FIG. 1). Therefore, by making the resistance through which the signal to diode 96 must charge dependent upon frequency, this problem is alleviated. For example, as the frequency increases, the voltage applied to terminal 36 in FIG. 4 will also increase. The increased voltage at terminal 36 will increase the DC current through diode 88, thus causing the resistance of diode 88 to decrease, thereby causing the phase shift of the signal applied to oscillator 30 to decrease. By the same token, as the frequency decreases, thus causing the phase-quadrature modulated reference signal Y′ to decrease, the voltage applied at terminal 36 will decrease also. This decrease in voltage at terminal 36 will cause a decrease in steady state current through diode 88 which will in turn cause an increase in the resistance of diode 88, thus causing the phase shift applied to oscillator 30 to increase. This has the effect of maintaining the modulated phase-quadrature reference signal Y′ at a constant magnitude as far as the phase shifting circuit of FIG. 4 is concerned.

Looking now at FIG. 1, the circuits therein shown also include a variometer feedback loop consisting of receiving coils 11 and 12, amplifier 22, amplitude and phase detector 58, amplifier 18 and coil 16 wound around ferromagnetic core 14. The purpose of this variometer feedback loop is to substantially minimize the phase-quadrature component of the received signal. Receiving coils 11 and 12 are reversed in polarity such that the signal induced in receiving coil 12 will be opposed in polarity by the signal induced in receiving coil 11. The location of the coils is such that receiving coil 11 is influenced more by the phase-quadrature direct coupling component than is receiving coil 12.

Some of the magnetic flux set up by transmitting coil 10 links with magnetic core 14 and receiving coils 11 and 12. The signal induced in receiving coils 11 and 12 is then amplified by receiving amplifier 22 and applied to amplitude and phase detector 58 which has an input filter that accepts only *f* frequency signal. Also applied to amplitude and phase detector 58 is a square wave signal of frequency *f* from bistable multivibrator 45 of square wave generator 42. This signal is shown in FIG. 3*f* and is the phase-quadrature detecting signal at frequency *f*. Thus, amplitude and phase detector 58 detects the magnitude of the phase-quadrature component of the received signal at *f* frequency. The DC output signal from amplitude and phase detector 58 is then applied to a first input of amplifier 18, which input contains a low pass filter to block the hundred cycle modulating signal. After amplification by amplifier 18, this DC signal is then applied to coil 16 along with the hundred cycle modulating signal from hundred cycle oscillator 20, which modulating signal is supplied to a second input terminal of amplifier 18. The DC signal in coil 16 saturates core 14, thus altering the permeability of core 14. This diverts the path of some of the magnetic flux linking between transmitting coil 10 and receiving coils 11 and 12. Thus, as the phase-quadrature component at *f* frequency of the received signal increases, the DC signal amplified by amplifier 18 will increase, thus increasing the permeability of magnetic core 14. Therefore, it can be seen that through this degenerative feedback action, the phase-quadrature component of the received signal at *f* frequency is substantially minimized.

Looking mathematically at the variometer feedback loop, it can be seen that by placing magnetic core 14 between the transmitting and receiving windings, magnetic core 14 will have the effect of introducing a negative voltage component into the phase-quadrature component as *f* frequency of the signal applied to receiving amplifier 22. Thus, the imaginary component at $f$ frequency of the received voltage of Equation 1 can be written:

$$V_y=jI_t[2\pi fM_0-Bf^{5/2}\sigma^{3/2}-kf]\approx 0 \quad (5)$$

where $kf$ is the component of $V_y$ caused by the variometer feedback loop, annd thus the imaginary component of impedance X at frequency $f$ is:

$$X_f=2\pi fM_0-Bf^{5/2}\sigma^{3/2}-kf \quad (6)$$

In U.S. Patent No. 3,147,429, supra, it was mathematically shown that the magnitude of the phase-quadrature component resulting from secondary current flow in the earth formation is approximately equal to the magnitude of the in-phase received signal component due to skin effect. By measuring the phase-quadrature component of the received signal resulting from secondary current flow in the earth formations and adding it to the total in-phase received signal, the skin effect error can be corrected. However, since the total phase-quadrature component of the received signal has been cancelled, at $f$ frequency in the present embodiment, it would be impossible to determine this phase-quadrature component due to secondary current flow at $f$ frequency. Therefore, a second signal at frequency $2f$ is applied to transmitting coil 10, and the in-phase and phase-quadrature components of the received signal are determined at frequency $2f$.

Returning to FIG. 1, oscillator 38 applies a square wave signal at frequency $8f$, shown in FIG. 3*a*, to bistable multivibrator 41. The "1" output of bistable multivibrator 41, shown in FIG. 3*b* triggers bistable multivibrator 43. The "1" output from bistable multivibrator 43, shown in FIG. 3*d* is the in-phase reference signal at frequency $2f$. The output "$\bar{1}$" from bistable multivibrator 41, shown in FIG. 3*c*, is applied to bistable multivibrator 44, whose output signal is the phase-quadrature reference signal at frequency $2f$ shown in FIG. 3*f*. The in-phase signal at frequency $2f$ from bistable multivibrator 43 is then applied to phase shift circuit 48 which operates in the same manner as phase shift circuit 54. The output from phase shift circuit 48 is then applied to the phase-locked Z$f$ oscillator 28 which produces a sinusoidal output signal at frequency $2f$, which signal is applied to transmitting amplifier 26 and then to transmitting coil 10. Receiving coils 11 and 12 then pick up the Z$f$ signal initiated by transmitting coil 10, which is then amplified by receiving amplifier 22. The output from receiving amplifier 22 is then applied to amplitude and phase detector 78, to which also is applied the phase-quadrature detecting signal at frequency $2f$ from bistable multivibrator 44, shown in FIG. 3*f*. Amplitude and phase detector 78 which has an input filter that accepts only $2f$ frequency signals, detects the phase-quadrature component of the received signal at frequency $2f$. The DC signal output from amplitude and phase detector 78 is then applied via cable conductor 9 to recorder 7 located at the surface of the earth. This DC signal is proportional to the phase-quadrature component of the received signal at frequency $2f$.

Looking now at the imaginary portion of Equation 1, it can be seen that using frequency $2f$, the imaginary component of Equation 1 can be written:

$$X_{2f}=4\pi fM_0-4\sqrt{2}Bf^{5/2}\sigma^{3/2}-2kf \quad (7)$$

By combining Equations 6 and 7, it can be seen that the imaginary portion of Equation 1 can be written:

$$X_{2f}=(4\sqrt{2}-2)Bf^{5/2}\sigma^{3/2} \quad (8)$$

Since the skin effect portion of Equation 1 equals $$B\cdot f^{5/2}\cdot\sigma^{3/2}$$

it can be seen that Equation 8 can be written $X_{2f}=kr_s$, $k$ being a constant, and $r_s$ being skin effect resistance. Since the DC signal applied to recorder 7 via line 9 from amplitude and phase detector 78 is proportional to $X_{2f}$, it can be seen that recorder 7 can be calibrated to give a reading of the skin effect, $r_s$.

Referring to FIG. 1 again, it is seen that the output from receiving amplifier 22 is also applied to amplitude and phase detector 32, to which also is applied a detecting signal (shown in FIG. 3*d* as the in-phase signal at frequency $2f$) from bistable multivibrator 43. Amplitude and phase detector 32, which has an input filter that only accepts $2f$ frequency signals, detects the in-phase portion of the received signal at frequency $2f$. The DC portion of the output from amplitude and phase detector 32 is then applied to differential amplifier 34, which compares this DC signal with the DC reference voltage applied at terminal 35. The DC output signal from differential amplifier 34 is then applied to oscillator 38 to control the frequency of oscillator 38, as previously discussed. Since the control of oscillator 38 follows a linear law, the voltage from the output of differential amplifier 34 is also proportional to the in-phase portion of the received signal at frequency $2f$. Thus, referring to Equation 1, it can be seen that the skin effect portion taken from amplitude and phase detector 78 can be added to the total in-phase component of the received signal seen at point 36 in FIG. 1 in the proper proportion to obtain just that component of voltage from the secondary currents circulating in the earth which gives the true conductivity reading.

However, since the undesired phase shift at frequency $2f$ may be different from that at frequency $f$, a separate phase correction feedback loop at frequency $2f$ is also provided. This phase correction loop at frequency $2f$ is shown in FIG. 1 as including transmitting coil 10, receiving coils 11 and 12, receiving amplifier 22, amplitude and phase detector 32, amplitude and phase detector 74, phase shift circuit 48, $2f$ oscillator 28, transmitting amplifier 26, and transmitting coil 10. The phase correction system at $2f$ frequency also makes use of modulating oscillator 20, amplifier 18 and coil 16 wound around magnetic core 14. The phase correction system at frequency $2f$ operates in the same manner as the phase correction system at frequency $f$, and the principle of operation shown in FIG. 2 is the same.

A signal is induced in receiving coils 11 and 12 due to the transmitting current in transmitting coil 10 which is amplified by receiving amplifier 22 and applied to amplitude and phase detector 32. An in-phase detecting signal at frequency $2f$ from bistable multivibrator 43 is also applied to amplitude and phase detector 32. The direct coupling component of flux from transmitting coil 10 is modulated at frequency $2f$ by the hundred cycle signal from oscillator 20 in the same manner as the signal at frequency $f$ is modulated. Amplitude and phase detector 74 receives the hundred cycle modulation signal, whose amplitude is dependent upon the in-phase portion of the modulated phase-quadrature signal Y′ (see FIGURE 2) at frequency $2f$, from amplitude and phase detector 32. A hundred cycle detecting signal from oscillator 20 is also applied to amplitude and phase detector 74. Amplitude and phase detector 74 provides a DC output proportional to the in-phase portion of the modulated phase-quadrature signal at frequency $2f$, to voltage-controlled phase shift circuit 48. Phase shift circuit 48 is the same form of circuit as phase shift circuit 54, shown in FIG. 4. Phase shift circuit 48 provides a signal to the $2f$ oscillator 28, which locks $2f$ oscillator 28 to a phase relationship with the applied signal from bistable multivibrator 43 that is dependent upon the DC signal provided from amplitude and phase detector 74. Oscillator 28 provides a sinusoidal signal at frequency $2f$ to transmitting amplifier 26, which provides the signal to transmitting coil 10. Thus, as the modulated phase-quadrature modulated signal Y′ at $2f$ varies from the phase-quadrature axis Z, the DC output from amplitude and phase detector 74 will vary, thus shifting the phase of the current $I_t$ at frequency $2f$ in transmitting coil 10. Thus, the modulated phase-quadrature signal Y′ at frequency 2*f* will be maintained on the phase-quadrature axis Z, thereby providing a correct phase relationship for the 2*f* frequency circuits.

It can now be seen that by using a second frequency 2*f* simultaneously with the first frequency, *f*, the phase-quadrature component of the received signal can be substantially minimized at *f* frequency, and, at the same time, measured at 2*f* frequency. In addition, results have been obtained which indicate that the zone of radial investigation from measuring the phase-quadrature component of the signal induced in the receiver coils from secondary current flow is different from and deeper than the radial investigation zone from measuring the in-phase component of the received signal from secondary current flow. Thus, measurements of two different radial distances from the borehole are obtained from leads 8 and 9 of the FIG. 1 embodiment.

It can also be seen that the frequency of oscillator 38 is varied to maintain skin effect error low, and, at the same time, phase correction at both frequencies, *f* and 2*f*, can take place simultaneously because of square wave generator 42, which maintains all of the square wave output signals from generator 42 at correct phase relationships to one another, and because of controlling phase shift circuits 48 and 54 with a voltage proportional to frequency.

Figure 5:
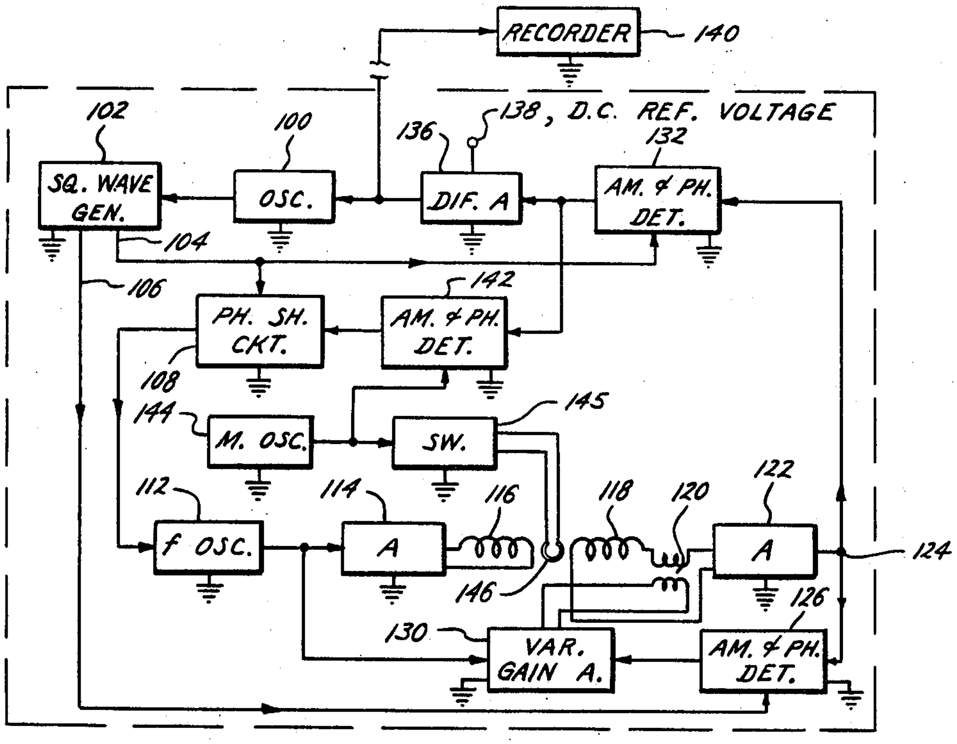
FIG. 5 illustrates schematically another embodiment of an induction logging system constructed in accordance with the principles of the present invention.

Looking now at FIG. 5, there is shown another embodiment of the present invention. In this embodiment, there is only one frequency utilized. Voltage-controlled variable-frequency oscillator 100 provides an output signal to square wave generator 102. Square wave generator 102 is similar to square wave generator 42 in FIG. 1. There are two outputs for square wave generator 102 shown as leads 104 and 106. Lead 104 provides an in-phase reference signal at frequency *f* which is applied as the detecting signal to amplitude and phase detector 132, and is also fed to a voltage-controlled phase shift circuit 108. Lead 106 provides the phase-quadrature detecting signal at frequency *f* to amplitude and phase detector 126. Voltage-controlled phase shift circuit 108 is of the same construction as phase shift circuits 54 and 48 of FIG. 1, shown in FIG. 4. The phase of the current $I_t$ in transmitting coil 116 is controlled in the same manner as in FIG. 1. That is a phase-locked oscillator 112 at frequency *f* which is phase and frequency locked to the output signal from voltage-controlled phase shift circuit 108.

The sinusoidal output signal from *f* oscillator 112 is then amplified by transmitting amplifier 114 and fed to transmitting coil 116. A signal is induced in receiving coil 118 by the current in transmitting coil 116 in the same manner as in the FIG. 1 embodiment. This received signal is then amplified by receiving amplifier 122 and fed to amplitude and phase detector 132, to which also is fed the in-phase detecting signal on line 104 from square wave generator 102. Amplitude and phase detector 132 detects the in-phase component of the received signal and provides a DC indication of this quantity to differential amplifier 136. Also applied to differential amplifier 136 is a constant magnitude DC reference voltage applied at terminal 138. Differential amplifier 136 provides a DC output proportional to the difference between these two applied inputs. This DC output signal from differential amplifier 136 controls the oscillation frequency of oscillator 100 and provides an indication of the apparent conductivity to recorder 140. Thus, it can be seen that the frequency *f* is regulated so as to maintain the received voltage component due to skin effect always low, in the same manner as was done in the FIG. 1 embodiment.

Considering the phase correction system of FIG. 5, there is shown a single-loop or single-turn coil 146 placed between transmitting coil 116 and receiving coil 118, in a position where the coupling geometrical factor is maximum. The signal from modulating oscillator 144 opens and closes switch 145 at a rate determined by the frequency of oscillator 144. Thus, the single-loop coil 146 is short circuited at a rate dependent upon the frequency of oscillator 144. This frequency may be, for example, 100 cycles per second. The resistance of this short circuit path, which includes coil 146, the leads between coil 146 and switch 145, and switch 145 (when closed), is substantially zero. Therefore, for all practical purposes, the only impedance associated with this short circuited loop is the inductance associated with coil 146.

A current will be induced in coil 146 by the flux set up by transmitting coil 116 whenever switch 145 is closed. This current in loop 146 will in turn induce a current in receiving coil 118. Since the impedance of coil 146 is, for all practical purposes, a pure inductance, the voltage induced in receiving coil 118 by coil 146 will be in phase-quadrature with the transmitting current $I_t$ in transmitting coil 116. The signal induced in receiving coil 118 is then amplified by receiving amplifier 122 and applied to amplitude and phase detector 132. The amplitude of the hundred cycle output signal applied to amplitude and phase detector 142 from amplitude and phase detector 132 is proportional to the in-phase portion of the modulated phase-quadrature signal Y′ (see FIGURE 2) as detected by amplitude and phase detector 132. A hundred cycle detecting signal from modulating oscillator 144 is also applied to amplitude and phase detector 142. Thus, the DC output signal from amplitude and phase detector 142 is proportional to the in-phase portion $Y_x'$ of the phase-quadrature modulated reference signal Y′. This DC output signal is fed to voltage-controlled phase shift circuit 108 to control the phase of the signal applied to *f* frequency oscillator 112. Thus, it can be seen that the phase correction system of FIG. 5 strives to keep the DC output signal from amplitude and phase detector 142 at a zero value, in the same manner as the phase correction system of FIG. 1.

Still looking at FIG. 5, there is also shown a variometer feedback loop consisting of transmitting amplifier 114, transmitting coil 116, receiving coil 118, receiving amplifier 122, amplitude and phase detector 126, variable-gain amplifier 130 and adding transformer 120. The purpose of the variometer loop of FIG. 5 is the same as that of the variometer loop of FIG. 1, that is, to cancel the phase-quadrature component of the received signal. The phase-quadrature detecting signal from square wave generator 102 is applied to amplitude and phase detector 126 via lead 106 to detect the phase-quadrature component of the received signal from receiving amplifier 122. Amplitude and phase detector 126 includes a low-pass output filter circuit which does not pass any appreciable 100 cycle components. The DC output signal from amplitude and phase detector 126 is thus proportional to the phase-quadrature component of the received signal, which output signal is applied to variable-gain amplifier 130 to control the gain of amplifier 130. Variable-gain amplifier 130 amplifies the sinusoidal signal from *f* frequency oscillator 112 in dependence upon the gain control signal from amplitude and phase detector 126. The *f* frequency output signal from amplifier 130 is applied to transformer 120 in a manner to subtract the phase-quadrature component of the signal received by receiving coil 118. Transformer 120 supplies the necessary 90° phase shift of the *f* frequency signal from amplifier 130. As the magnitude of the phase-quadrature component of the received signal varies, the DC output from amplitude and phase detector 126 varies proportionally, thus varying the gain of variable gain amplifier 130, which varies the magnitude of the signal applied to transformer 120. Thus, the variometer feedback loop is continually working to provide a DC output signal from amplitude and phase detector 126 of a zero magnitude. Thus, it can be seen that this variometer feedback loop acts in a manner to substantially minimize the phase-quadrature component of the received signal.

The embodiment shown in FIG. 5 can be modified to include the 2$f$ frequency circuits of FIG. 1, if desired. Also, a multiple-frequency $nf$ could be used instead of the frequency 2$f$ shown in the embodiment of FIG. 1, although there are less circuit elements required for the frequency 2$f$.

Also, instead of holding the product $f^2\sigma$ constant by applying a constant reference voltage to the differential amplifiers of FIGS. 1 and 5, the product $f\sigma$ could be held constant by controlling the variable frequency oscillators 38 and 100 of FIGS. 1 and 5, respectively, by applying thereto a voltage proportional to the difference between the voltage proportional to frequency and the voltage proportional to conductivity, as shown in U.S. Patent No. 3,119,061, supra.

While there have been described what are at present considered to be preferred embodiments of this invention, it will be obvious to those skilled in the art that various changes and modifications may be made without departing from the invention, and it is, therefore, intended to cover all such changes and modifications as fall within the true spirit and scope of this invention.

What is claimed is:

1. In logging apparatus for investigating earth formations traversed by a borehole, the combination comprising: means for generating a reference signal; means responsive to said reference signal for inducing an electromagnetic field into the formations; receiving means responsive to the induced electromagnetic field for producing a signal representative of a characteristic of the adjoining formation; and means responsive to a given component of the received field for adjusting the phase of the field induced into the formation relative to the phase of said reference signal to compensate for undesired phase shifts.

2. In logging apparatus for investigating earth formations traversed by a borehole, the combination comprising: means for generating a reference signal; means responsive to said reference signal for inducing an electromagnetic field into the ground; receiving means for producing a received signal in response to the field initiated by said inducing means; means located in magnetic proximity to said inducing and receiving means for modulating a given component of the field set up by the inducing means to cause a modulated signal to be induced in the receiving means; means responsive to the modulated signal for adjusting the phase of the field induced into the ground relative to the phase of said reference signal to compensate for undesired phase shifts produced by the inducing and receiving means; and means responsive to at least one component of the received signal for providing a measure of a characteristic of the formations.

3. In logging apparatus for investigating earth formations traversed by a borehole, the combination comprising: means for generating current having a given phase; means responsive to the generated current for inducing an electromagnetic field into the ground; receiving means for producing an electrical signal in response to the field initiated by the inducing means; means responsive to a given component of said electrical signal for adjusting the phase of the field induced into the ground relative to said given phase to compensate for undesired phase shifts produced by the inducing and receiving means, said phase adjusting means including a phase shift circuit which shifts the phase of the generated current in response to said given component of the electrical signals; and means responsive to at least one component of the received signal for providing a measure of a characteristic of the formations.

4. In logging apparatus for investigating earth formations traversed by a borehole, the combination comprising: means for generating current having a given phase; means responsive to the generated current for inducing an electromagnetic field into the ground; receiving means for producing a signal in response to the field initiated by the inducing means; means located intermediate of said inducing and receiving means for modulating a given component of the field initiated by the inducing means, said modulated field producing a modulated electrical signal in the receiving means; means for adjusting the phase of the signal induced into the ground relative to said given phase to compensate for undesired phase shifts produced by the inducing and receiving means, said phase adjusting means including a phase shift circuit which shifts the phase of generated current in response to the modulated electrical signal; and means responsive to at least one component of the received signal for providing a measure of a characteristic of the formations.

5. In logging apparatus for investigating earth formations traversed by a borehole, the combination comprising: means for generating signals at first and second frequencies; means responsive to said generated signals for inducing electromagnetic fields at said first and second frequencies into the ground; means for receiving said fields to produce received electrical signals, said received signals having in-phase and phase-quadrature components relative to the phases of said generated signals at both frequencies; means responsive to said received electrical signals and operating at the first frequency to minimize the phase-quadrature component at the first frequency; and means responsive to the received electrical signals and operating at the second frequency to detect the magnitude of the in-phase and phase-quadrature components at said second frequency to produce representations of certain characteristics of the adjoining formations.

6. In logging apparatus for investigating earth formations traversed by a borehole, the combination comprising: means for generating a reference signal; means responsive to said reference signal for inducing an electromagnetic field into the ground; receiving means for producing a received signal in response to the field initiated by the inducing means, said received signal containing in-phase and phase-quadrature components relative to the phase of said reference signal; means coupled to the receiving means for minimizing the phase-quadrature component of the received signal; means located in magnetic proximity to said inducing and receiving means for modulating a given component of the field initiated by the inducing means to produce a modulated electrical signal in the receiving means; means responsive to the modulated electrical signal for adjusting the phase of the field induced into the ground relative to the phase of said reference signal to compensate for undesired phase shifts produced by the inducing and receiving means; and means coupled to the receiving means for detecting the in-phase and phase-quadrature components of the received signal to obtain representations of certain characteristics of the formations.

7. In logging apparatus for investigating earth formations traversed by a borehole, the combination comprising: means for generating a reference signal; means responsive to said reference signal for inducing an electromagnetic field into the ground; receiving means for producing a received signal in response to the field initiated by the inducing means, said received signal containing in-phase and phase-quadrature components relative to the phase of said reference signal; means coupled to the receiving means for minimizing the phase-quadrature component of the received signal; means located in magnetic proximity to said inducing and receiving means for modulating a given component of the field initiated by the inducing means to produce a modulated electrical signal in the receiving means; means responsive to the modulated electrical signal for adjusting the phase of the field induced into the ground relative to the phase of said reference signal to compensate for undesired phase shifts produced by the inducing and receiving means; and means coupled to the receiving means for detecting the in-phase and phase-quadrature components of the received signal to provide representations of certain characteristics of the adjoining formations, the frequency of said reference signal being a function of one of said detected components of the received signal.

8. In logging apparatus for investigating earth formations traversed by a borehole, the combination comprising: means for generating signals at first and second frequencies; means responsive to said generated signals for inducing electromagnetic fields at said first and second frequencies into the ground; receiving means for producing received signals in response to the fields initiated by the inducing means, said received signals containing in-phase and phase quadrature components relative to the phases of said generated signals; means coupled to the receiving means and operating at a first frequency for minimizing the phase-quadrature component of the received signal at the first frequency; means located in magnetic proximity to the inducing and receiving means for modulating given components of the fields initiated by the inducing means at both the first and second frequencies to produce modulated electrical signals in the receiving means; means responsive to the modulated electrical signals for adjusting the phases of the fields induced into the ground at both frequencies relative to the phases of said generated signals to compensate for undesired phase shifts; and means coupled to the receiving means and operating at a second frequency for detecting the in-phase and phase-quadrature components of the received signal at said second frequency to provide representations of certain characteristics of the formations.

9. In logging apparatus for investigating earth formations traversed by a borehole, the combination comprising: means for generating square wave signals at first and second frequencies; means responsive to the square wave signals for inducing electromagnetic fields at the first and second frequencies into the ground; receiving means for producing received signals in response to the fields initiated by the inducing means, said received signals containing in-phase and phase-quadrature components relative to the phases of said generated signals; means coupled to the receiving means and operating at a first frequency for minimizing the phase-quadrature component of the received signal at the first frequency; means disposed in magnetic proximity to the inducing and receiving means for modulating given components of the fields to produce modulated electrical signals at the first and second frequencies in the receiving means; means responsive to the modulated signals for adjusting the phase of the induced fields relative to the phases of said generated signals to compensate for undesired phase shifts produced by the inducing and receving means; and means coupled to the receiving means and operating at a second frequency for detecting the in-phase and phase-quadrature components of the received signal to provide representations of certain characteristics of the formations.

10. In logging apparatus for investigating earth formations traversed by a borehole, the combination comprising: variable frequency oscillator means; second oscillator means for generating a sinusoidal signal; means responsive to the sinusoidal signal for inducing an electromagnetic field into the ground; receiving means for producing a received signal in response to the field initiated by the inducing means; means responsive to a first given component of the received signal for generating a first signal which controls the frequency of the variable frequency oscillator and provides a measure of a given characteristic of the formations; means responsive to a second given component of the received signal for generating a second signal representative of the amount of undesired phase shift in the received signal; means including an electrical phase shift circuit for controlling the phase of the second oscillator means, said electrical phase shift circuit comprising: a variable resistance element; means for supplying the first signal to the variable resistance element for controlling said resistance in accordance with the variable oscillator frequency; a variable reactance element; means for supplying the second signal to the variable reactance element for controlling said reactance; means for supplying the variable frequency oscillator output signal to the variable resistance and variable reactance elements to produce an output signal for controlling the frequency and phase of the sinusoidal signal output from the second oscillator means.

11. In induction logging apparatus for investigating earth formations traversed by a borehole, the combination comprising: a longitudinally extending support member adapted for movement through the borehole; a coil system supported by said support member and having individual coils spaced longitudinally along said support member; means for energizing a first part of the coil system to induce an electromagnetic field in the formations; a second part of the coil system adapted to produce a received signal in response to the field initiated by the first part of the coil system; a magnetic core supported by said support member and located in magnetic proximity to the coil system and spaced apart from individual coils of the coil system for altering the flux coupling the first and second parts of the coil system; and means responsive to the received signal for producing a signal representative of a desired characteristic of the formations.

12. In induction logging apparatus for investigating earth formations traversed by a borehole, the combination comprising: a coil system adapted for movement through the borehole; means for generating a reference signal; means responsive to said reference signal for energizing a first part of the coil system to induce an electromagnetic field in the formations; a second part of the coil system adapted for producing a received signal in response to the field initiated by the first part of the coil system, said received signal having in-phase and phase-quadrature components relative to the phase of said reference signal; means for minimizing the phase-quadrature component of the received signal including: a magnetic core located in magnetic proximity to the coil system; and means responsive to the received signal for producing a signal representative of a desired characteristic of the formations and altering the permeability of the magnetic core for minimizing the phase-quadrature component of the received signal.

13. In induction logging apparatus for investigating earth formations traversed by a borehole, the combination comprising: a coil system adapted for movement through the borehole; means for generating a reference signal; means responsive to said reference signal for energizing a first part of the coil system with said electrical signal to produce an electromagnetic field in the formations; a second part of the coil system adapted to produce a received signal in response to the field initiated by the first part of the coil system, said received signal having in-phase and phase-quadrature components relative to the phase of said reference signal; a magnetic core located between the two parts of the coil system; means coupled to the magnetic core for modulating the direct flux coupling the two parts of the coil system to produce a modulated electrical signal in the second part of the coil system; means responsive to the modulated electrical signal for adjusting the phase of the signal supplied to the first part of the coil system relative to the phase of said reference signal to compensate for undesired phase shifts; and means responsive to the received signal for providing representations of certain characteristics of the formations.

14. In induction logging apparatus for investigating earth formations traversed by a borehole, the combination comprising: a coil system adapted for movement through the borehole; means for generating a reference signal; means responsive to said reference signal for energizing a first part of the coil system with an electrical signal to induce an electromagnetic field in the formations; a second part of the coil system adapted to produce a received signal in response to the field initiated by the first part of the coil system, said received signal including in-phase and phase-quadrature components relative to the phase of said reference signal; a magnetic core located in magnetic proximity to the coil system; means responsive to the phase-quadrature component of the received signal for altering the permeability of the magnetic core for minimizing the phase-quadrature component of the received signal; means coupled to the magnetic core for modulating a portion of the field initiated by the first part of the coil system to produce a modulated electrical signal in the second part of the coil system; means responsive to the modulated electrical signal for adjusting the phase of the signal supplied to the first part of the coil system relative to the phase of said reference signal to compensate for undesired phase shifts; and means responsive to the received signal for detecting the in-phase and phase-quadrature components of the received signal to produce representations of certain characteristics of the formations.

15. In induction logging apparatus for investigating earth formations traversed by a borehole, the combination comprising: a coil system adapted for movement through the borehole; means for generating signals at first and second frequencies; means responsive to said generated signals for energizing a first part of the coil system with signals at said first and second frequencies to induce electromagnetic fields in the formations; a second part of the coil system adapted to produce received signals in response to the fields initiated by the first part of the coil system, said received signals containing in-phase and phase-quadrature components at the first and second frequencies relative to the phases of said generated signals; a magnetic core located in magnetic proximity to the coil system; means responsive to the phase-quadrature component of the received signal at the first frequency for altering the permeability of the magnetic core for minimizing the phase-quadrature component of the received signal; and means responsive to the second frequency portion of the received signal for detecting the in-phase and phase-quadrature components of the received signal to provide representations of certain characteristics of the formations.

16. In logging apparatus for investigating earth formations traversed by a borehole, apparatus for detecting a given component of an electromagnetic field emitted into the formations:

(a) inducing means for inducing an electromagnetic field into the adjoining formations;

(b) receiving means responsive to the field initiated by the inducing means for producing a signal representative of the field detected by the receiving means;

(c) means for generating a modulation signal;

(d) means located in magnetic proximity to the inducing and receiving means and responsive to the modulation signal for modulating a component of the field initiated by the inducing means, the modulated field component also being received by said receiving means to produce a modulated electrical signal; and (e) means responsive to the modulated electrical signal for detecting said component of the electromagnetic field.

17. In logging apparatus for investigating earth formations traversed by a borehole, apparatus for detecting a given component of an electromagnetic field emitted into the formations:

(a) inducing means for inducing an electromagnetic field into the adjoining formation;

(b) receiving means responsive to the field initiated by the inducing means for producing a signal representative of the field detected by the receiving means;

(c) means for generating a modulation signal;

(d) a magnetic core located between the inducing and receiving means;

(e) means responsive to the modulation signal for varying the permeability of the magnetic core to modulate the field directly linking the inducing and receiving means, said modulated field also being received by said receiving means to produce a modulated electrical signal; and (f) means responsive to the modulated electrical signal for detecting the magnitude of the field which directly links the inducing and receiving means.

18. In apparatus for investigating earth formations traversed by a borehole, the combination comprising:

(a) transmitting and receiving coil arrays, each having at least one coil, adapted for movement through the borehole;

(b) means for generating a reference signal;

(c) means responsive to said reference signal for supplying current to the transmitting coil array for inducing an electromagnetic field into the formations;

(d) means coupled to the receiving coil array for producing an electrical signal representative of the field detected by the receiving coil array, at least a component of said electrical signal being representative of a given characteristic of the formations;

(e) means responsive to a given component of said electrical signal for adjusting the phase of the current supplied to the transmitting coil array relative to the phase of said reference signal to compensate for undesired phase shifts produced by at least the transmitting and receiving coil arrays.

19. In apparatus for investigating earth formations traversed by a borehole, the combination comprising:

(a) transmitting and receiving coil arrays, each having at least one coil, adapted for movement through the borehole;

(b) a variable frequency oscillator for providing a reference signal;

(c) means responsive to the reference signal for supplying current to the transmitting coil array for inducing an electromagentic field into the formations;

(d) means coupled to the receiving coil array for producing a received electrical signal representative of the field detected by the receiving coil array, at least a component of said received signal being representative of a given characteristic of the formations; and (e) means responsive to the electrical signal representative of the detected field for adjusting the frequency of the reference signal and adjusting the phase of the current supplied to the transmitting coil array relative to the phase of said reference signal to compensate for undesired phase shifts produced by at least the transmitting and receiving coil arrays.

20. In apparatus for investigating earth formations traversed by a borehole, the combination comprising:

(a) transmitting and receiving coil arrays, each having at least one coil, adapted for movement through the borehole;

(b) a variable frequency oscillator for providing a reference signal;

(c) means responsive to the reference signal for supplying current at first and second frequencies to the transmitting coil array for inducing electromagnetic fields at the first and second frequencies into the formations;

(d) means coupled to the receiving coil array for producing received electrical signals at the first and second frequencies representative of the fields detected by the receiving coil array, the electrical signals at both frequencies having in-phase and phase-quadrature components relative to the phase of said reference signal;

(e) means responsive to the phase-quadrature component of the electrical signal at the first frequency for minimizing the phase-quadrature component of the received signal at the first frequency; and (f) means responsive to the in-phase component of the received signal at the second frequency for adjusting the frequency of the variable frequency oscillator and producing a signal representative of a given characteristic of the formations.

21. In apparatus for investigating earth formations traversed by a borehole, the combination comprising:

(a) transmitting and receiving coil arrays, each having at least one coil, adapted for movement through the borehole;
(b) means for generating a reference signal;
(c) means responsive to said reference signal for supplying current to the transmitting coil array for inducing an electromagnetic field into the formations;
(d) impedance means located between the transmitting and receiving coil arrays;
(e) means for energizing the impedance means at a given modulation frequency to produce a modulated electrical signal in the receiving coil array;
(f) means coupled to the receiving coil array for producing a received electrical signal representative of the field detected by the receiving coil array, at least a component of said received signal being representative of a given characteristic of the formations; and
(g) means responsive to the modulated signal for adjusting the phase of the current supplied to the transmitting coil array relative to the phase of said reference signal to compensate for undesired phase shifts produced by at least the transmitting and receiving coil arrays.

22. Apparatus for investigating earth formation traversed by a borehole, comprising:

(a) a coil array adapted to be moved through a borehole, the coil array having at least one transmitting coil and at least one receiving coil;
(b) means for generating a reference signal;
(c) means responsive to said reference signal for energizing the transmitting coil with a transmitting current to emit an electromagnetic field therefrom, which field produces a received signal having in-phase and phase-quadrature components in the receiving coil relative to the phase of said reference signal;
(d) means for detecting the in-phase component of the received signal relative to the phase of said reference signal to provide a measure of a characteristic of the formations;
(e) means for modulating the field directly coupling the transmitting and receiving coils to produce a modulated signal in the receiving coil;
(f) means for detecting the modulation signal component of the detected in-phase component of the received signal to produce a phase correction signal; and
(g) means for adjusting the phase of the transmitting current relative to the phase of said reference signal in response to the phase correction signal until the phase correction signal attains a given minimum amplitude level.

23. A method of investigating earth formations traversed by a borehole, comprising:

(a) moving a coil array through a borehole, the coil array having at least one transmitting coil and at least one receiving coil;
(b) generating a reference signal;
(c) energizing the transmitting coil with transmitting current in response to the reference signal to emit an electromagnetic field therefrom, which electromagnetic field produces a received signal in the receiving coil;
(d) detecting a given component of the received signal to provide a measure of a characteristic of the formations;
(e) modulating a given component of the field to produce a modulated signal in the receiving coil; and
(f) adjusting the phase of the transmitting current relative to the phase of the reference signal and in response to the modulated signal to compensate for undesired phase shifts produced by at least the coil array.

24. A method of investigating earth formations traversed by a borehole, comprising:

(a) moving a coil array through a borehole, the coil array having at least one transmitting coil and at least one receiving coil;
(b) generating reference signals at first and second frequencies;
(c) energizing the transmitting coil with transmitting current at said first and second frequencies in response to said reference signals to emit electromagnetic fields therefrom, which fields produce received signals having in-phase and phase-quadrature components relative to the phases of said reference signals in the receiving coil;
(d) detecting the phase-quadrature component at the first frequency and minimizing said phase-quadrature component at the first frequency in response to the detected component; and
(e) detecting at least the phase-quadrature component at the second frequency to provide a measure of a characteristic of the formations.

25. A method useful in induction logging for minimizing the direct electromagnetic coupling between transmitting and receiving coils, comprising:

(a) moving a coil array through a borehole, the coil array having at least one transmitting coil, at least one receiving coil, and one other auxiliary coil wound around a magnetic core;
(b) generating a reference signal;
(c) energizing the transmitting coil to emit an electromagnetic field therefrom in response to said reference signal, which field produces a received signal having in-phase and phase-quadrature components relative to the phase of said reference signal in the receiving coil; and
(d) detecting the phase-quadrature component of the received signal and supplying current to the auxiliary coil in response to the detected phase-quadrature component for altering the permeability of the magnetic core so as to minimize the phase-quadrature component of the received signal.

26. A method useful in induction logging for minimizing the direct electromagnetic coupling between transmitting and receiving coils and correcting for undesired phase shifts, comprising:

(a) moving a coil array through a borehole, the coil array having at least one transmitting coil, at least one receiving coil, and one other auxiliary coil wound around a magnetic core;
(b) generating a reference signal;
(c) energizing the transmitting coil with a transmitting current in response to said reference signal to emit an electromagnetic field therefrom, which field produces a received signal having in-phase and phase-quadrature components relative to the phase of said reference signal in the receiving coil;
(d) detecting the phase-quadrature component of the received signal and supplying current to the auxiliary coil in response to the detected phase-quadrature component for altering the permeability of the magnetic core so as to minimize the phase-quadrature component of the received signal;
(e) supplying modulating current to the auxiliary coil for modulating the field directly coupling the transmitting and receiving coils to produce a modulated signal in the receiving coil;
(f) detecting the in-phase component of the received signal;
(g) detecting the modulation signal component of the detected in-phase component to produce a phase correction signal; and (h) adjusting the phase of the transmitting current relative to the phase of said reference signal in response to the phase correction signal until the phase correction signal attains a given minimum amplitude level.

27. A method of investigating earth formations traversed by a borehole, comprising:

(a) moving a coil array through a borehole, the coil array having at least one transmitting coil and at least one receiving coil;

(b) generating a reference signal;

(c) energizing the transmitting coil with a transmitting current in response to said reference signal to emit an electromagnetic field therefrom, which field produces a received signal having in-phase and phase-quadrature components relative to the phase of said reference signal in the receiving coil;

(d) detecting the in-phase component of the received signal to provide a measure of a characteristic of the formations;

(e) modulating the field directly coupling the transmitting and receiving coils to produce a modulated signal in the receiving coil;

(f) detecting the modulation signal component of the detected in-phase component of the received signal to produce a phase correction signal; and (g) adjusting the phase of the transmitting current relative to the phase of said reference signal in response to the phase correction signal until the phase correction signal attains a given minimum amplitude level.

28. A method of investigating earth formations traversed by a borehole, comprising:

(a) moving a coil array through a borehole, the coil array having at least one transmitting coil and at least one receiving coil;

(b) generating a frequency reference signal which is adapted to be variable;

(c) energizing the transmitting coil with transmitting current derived from the frequency reference signal to emit an electromagnetic field from the transmitting coil, which field produces a received signal having in-phase and phase-quadrature components relative to the phase of said reference signal in the receiving coil;

(d) detecting the in-phase component of the received signal to produce a first signal for controlling the reference frequency and providing a measure of a characteristic of the formations;

(e) modulating the field directly coupling the transmitting and receiving coils to produce a modulated signal in the receiving coil;

(f) detecting the modulation signal component of the detected in-phase component of the received signal to produce a phase correction signal; and (g) adjusting the phase of the transmitting current relative to the phase of said reference signal in response to the phase correction signal, first signal, and the frequency reference signal until the phase correction signal attains a desired minimum level.

29. The apparatus of claim 5 wherein said means operative at the first frequency to minimize the phase-quadrature component includes detection means responsive to said first frequency generated signal for detecting the phase-quadrature component of said received signal to produce a control signal, means responsive to said control signal for minimizing the phase-quadrature component of said received signal.

30. The method of claim 24 wherein the step of detecting at least the phase-quadrature component at the second frequency further includes the step of detecting the in-phase component of the received signal at the second frequency, both said in-phase and phase-quadrature components being detected in response to said reference signal at the second frequency.

31. The method of claim 30 wherein the steps of detecting and minimizing the phase-quadrature component at the first frequency includes the steps of detecting that component of the received signal that is in phase-quadrature with the first frequency reference signal to produce a control signal, and minimizing the phase-quadrature component of said received signal in response to said control signal.

References Cited

UNITED STATES PATENTS

| | | | |
|---|---|---|---|
| 2,406,870 | 9/1946 | Vacquier | 324—8 XR |
| 2,741,757 | 4/1956 | Devol et al. | 324—43 XR |
| 3,051,892 | 8/1962 | Huston | 324—6 |
| 3,259,837 | 7/1966 | Oshry | 324—6 |
| 2,220,788 | 11/1940 | Lohman | 324—6 |
| 3,147,429 | 9/1964 | Moran | 324—6 |
| 3,164,993 | 1/1965 | Schmidt | 324—40 XR |
| 3,187,252 | 6/1965 | Hungerford | 324—6 |
| 3,328,679 | 6/1967 | Sloughter | 324—6 |

GERARD R. STRECKER, Primary Examiner